(12) United States Patent
Palacino

(10) Patent No.: US 10,277,725 B2
(45) Date of Patent: Apr. 30, 2019

(54) MOBILE DEVICE SECURING SYSTEM

(71) Applicant: Theodore Palacino, Taylors, SC (US)

(72) Inventor: Theodore Palacino, Taylors, SC (US)

( * ) Notice: Subject to any disclaimer, the term of this patent is extended or adjusted under 35 U.S.C. 154(b) by 0 days.

(21) Appl. No.: 16/189,001

(22) Filed: Nov. 13, 2018

(65) Prior Publication Data

US 2019/0082042 A1    Mar. 14, 2019

Related U.S. Application Data

(62) Division of application No. 15/330,972, filed on Jan. 24, 2017.

(60) Provisional application No. 62/287,027, filed on Jan. 26, 2016.

(51) Int. Cl.
| | | |
|---|---|---|
| *H04M 1/04* | (2006.01) | |
| *H04M 1/725* | (2006.01) | |
| *H04B 1/3827* | (2015.01) | |

(52) U.S. Cl.
CPC .............. *H04M 1/04* (2013.01); *H04B 1/385* (2013.01); *H04B 2001/3861* (2013.01); *H04M 1/72527* (2013.01)

(58) Field of Classification Search
CPC .... H04M 1/04; H04M 1/72527; H04B 1/385; H04B 2001/3861
See application file for complete search history.

(56) References Cited

U.S. PATENT DOCUMENTS

| | | | |
|---|---|---|---|
| 7,286,803 B2 | 10/2007 | Hamasaki et al. | |
| 9,155,377 B2 | 10/2015 | Wangercyn, Jr. et al. | |
| 9,198,307 B1 | 11/2015 | Leondaus | |
| 9,265,310 B2 | 2/2016 | Lam | |
| 9,651,992 B2 | 5/2017 | Stotler | |
| 9,793,941 B1 | 10/2017 | Hirsch | |
| 2012/0187706 A1 | 7/2012 | Kannaka | |
| 2013/0029507 A1 | 1/2013 | Yang | |
| 2014/0313118 A1 | 10/2014 | Brown | |
| 2016/0344437 A1* | 11/2016 | Gordon | H04B 1/3888 |
| 2017/0324852 A1 | 11/2017 | Sadai | |

FOREIGN PATENT DOCUMENTS

| | | |
|---|---|---|
| CN | 203322674 | 12/2013 |
| CN | 203941476 | 11/2014 |
| JP | 411168539 | 6/1999 |

(Continued)

OTHER PUBLICATIONS http://odditymall.com/ring-iphone-case, Aug. 7, 2015.
http://www.loopycases.com, Jul. 3, 2013.

*Primary Examiner* — Nguyen T Vo
(74) *Attorney, Agent, or Firm* — Burr & Forman LLP; Hunter S. Freeman

(57) ABSTRACT

The present invention relates to a mobile device securing system that allows a user to insert his/her finger into a finger gap created by the invention when engaged with the mobile device. This invention may be used on any number of mobile devices, provided that the mobile device has one or more ports included therein. The invention includes at least one connector disposed on a connecting end that may be inserted into a port included in the mobile device to create a finger gap into which a user may insert his/her finger therein, thus reducing the risk that the mobile device will be dropped when held with one hand.

12 Claims, 7 Drawing Sheets

(56) References Cited

FOREIGN PATENT DOCUMENTS

| | | |
|---|---|---|
| KR | 20080076520 | 8/2008 |
| KR | 101510449 | 4/2015 |
| KR | 20150105737 | 9/2015 |

* cited by examiner

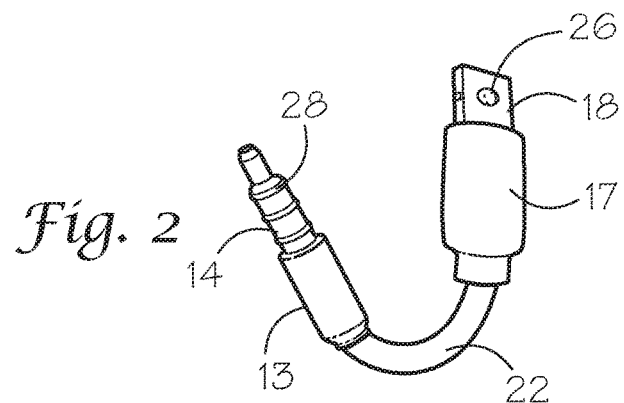
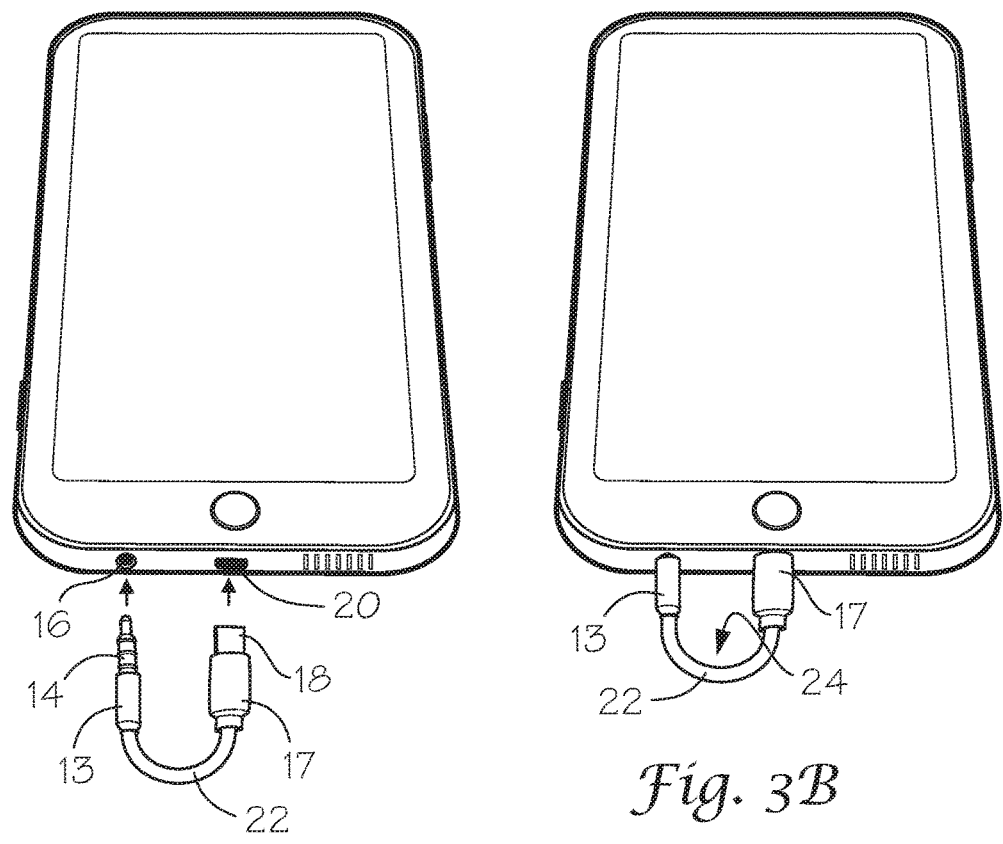

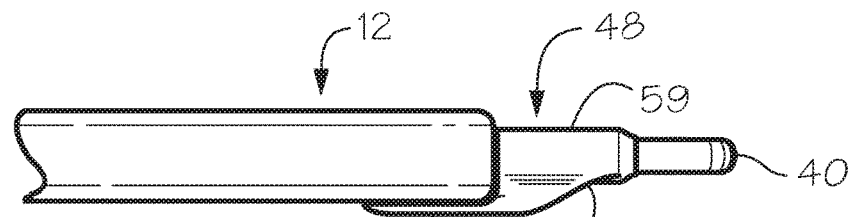
Fig. 5C
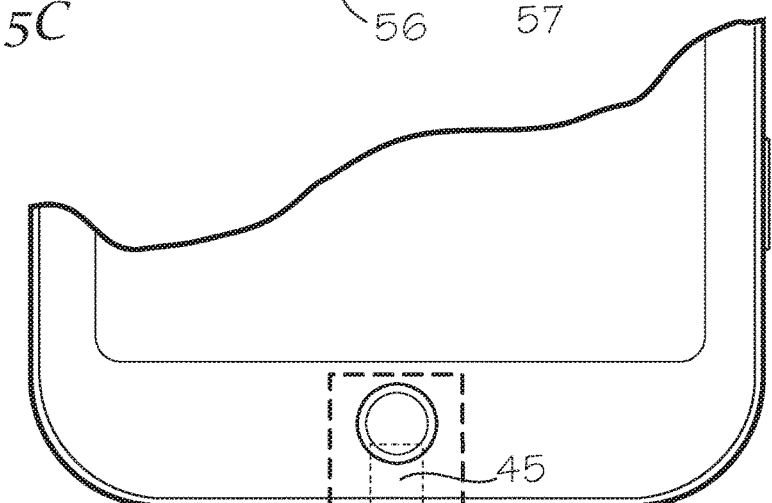
Fig. 5D
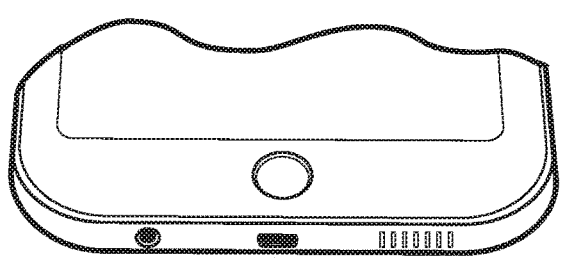
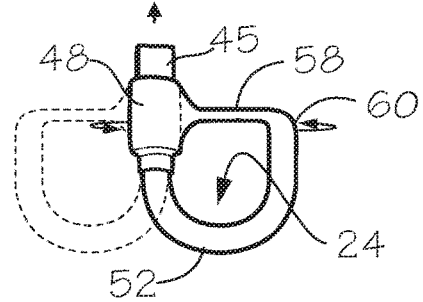
Fig. 5E

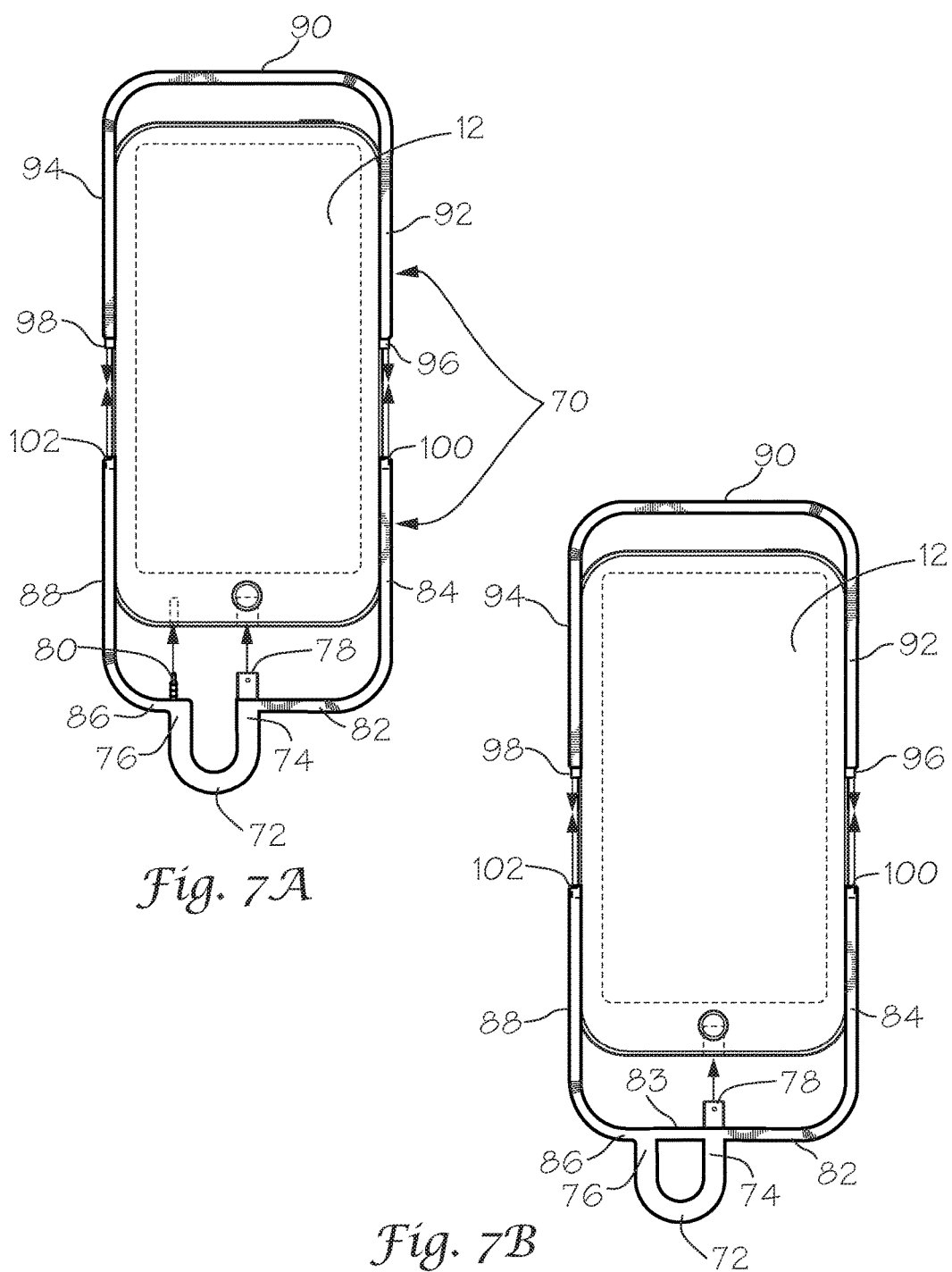

MOBILE DEVICE SECURING SYSTEM

BACKGROUND OF THE INVENTION

1) Field of the Invention

The present invention relates to a mobile device securing system that allows the user of a mobile device to insert his/her finger into a gap or loop that is created by inserting at least a connector disposed on a first connecting end of the invention into a first port of a mobile device. In at least one embodiment, the loop is created by inserting a second connector disposed on a second securing end of the invention into a second port of the mobile device. When one or more of the connectors engage a port of the mobile device, a retaining member interconnecting the connecting end and the securing end defines a finger gap or loop that is adapted to receive a user's finger, thus allowing the user to insert a finger and prevent the mobile device from falling from the user's grasp.

2) Description of Related Art

The use of a casing or housing for a mobile that includes a loop is known. Given the increasing size of mobile devices, however, many users prefer not to use casings or housings that increase the size and weight of the mobile device. Moreover, cases can be very expensive and given the already high price of the mobile device, users are looking for a more economical means of protecting their mobile device. The lack of the casing and/or housing increases the need to ensure that the mobile device is not dropped during use.

Accordingly, it is an object of the present invention to provide additional stability and to decrease the chance of dropping the mobile device during use by providing a finger gap or loop into which the user can insert his/her finger during use of the mobile device, without the use of a casing or housing for the mobile device. It is also an object of the invention to provide a device that is much smaller, less bulky and lighter than ordinary cases for mobile devices.

SUMMARY OF THE INVENTION

The above objectives are accomplished according to the present invention by providing a securing system for a mobile device comprising: a retaining member having a connecting end at a first distal end portion and a securing end at an opposing second distal end portion; a first connector carried by said connecting end that engages a first port on a mobile device so that when said first connector engages the first port, said retaining member extends outwardly from the mobile device and said securing end is directed back toward the mobile device so that said securing end is adjacent to the mobile device; and a finger gap is disposed between said connecting end and said securing end and is defined by said retaining member and the mobile device, said finger gap defining an opening to receive a finger, thus allowing a user to insert a finger into said finger gap to reduce the risk of the mobile device falling from the user's grasp.

Another embodiment of the invention further comprises a second connector carried by said securing end that engages a second port on the mobile device for further securing said retaining member to the mobile device and further stabilizing said finger gap around the finger that is inserted in said finger gap.

Another embodiment of the invention further comprises a bracket carried by said securing end that contacts at least two sides of the mobile device when said connector engages the port on the mobile device so that said securing end is removably attached to the mobile device and has a generally U-shaped arrangement.

In at least one embodiment of the invention, the retaining member is radiused so that the opening defined by said finger gap is generally rounded.

In at least one embodiment of the invention, the connecting end is rotatably carried by said retaining member so that when said connector engages the port on the mobile device, said retaining member may rotate with respect to the mobile device.

Another embodiment of the invention further comprises a cross bar that extends between said connecting end and said securing end, wherein said finger gap is defined by said retaining member and said crossbar.

Another embodiment of the invention further comprises a support plate disposed on said connecting end and extending toward and generally parallel with said connector so that when said connector engages the port on the mobile device, said support plate contacts at least one surface of the mobile device, thereby providing increased stability to said retaining member.

Another embodiment of the invention further comprises a pass through port comprising one of a power port, an audio port and a data port, said pass through port being disposed on said connecting end and below said connector so that said pass through port is in communications with said connector so that when said connector engages the port on the mobile device, the pass through port may receive an external connector thereby placing the external connector in communication with the port on the mobile device.

Another embodiment of the invention further comprises a first bumper that extends outwardly from said securing end and an opposing second bumper that extends outwardly from said connecting end so that when said connector engages the port on the mobile phone, said first bumper and said second bumper receive and secure at least three sides of the mobile device.

Another embodiment of the invention further comprises a first bottom bumper portion extending generally perpendicular from said connecting end and generally parallel to a bottom side of the mobile device; a second bottom bumper portion extending generally perpendicular from said securing end and generally opposite from said first bottom bumper portion; a first side bumper portion extending generally perpendicular to said first bottom bumper portion and generally parallel to a first side of the mobile device; a second side bumper portion extending generally perpendicular to said second bottom bumper portion and generally parallel to a second side of the mobile device that is opposite of the first side of the mobile device; a top bumper portion that extends between said right side bumper portion and said left side bumper portion so that said top bumper portion is generally parallel to a top side of the mobile device; and, wherein when said connector carried by said connecting end of said retaining member engages the port on the mobile device, said first bottom portion and said second bottom bumper portion contact the bottom side of the mobile device, said right side bumper portion contacts the first side of the mobile device, said left side bumper portion contacts the second side of the mobile device and said top bumper portion contacts the top side of the mobile device, thereby covering at least a portion of the circumference of the mobile device.

In one embodiment of the invention, the securing end defines an opening for surrounding the wire of a jack that engages a second port on the mobile device, wherein said finger gap is defined by said retaining member, the wire to the jack engaging the second port of the mobile and at least one surface of the mobile device.

In one embodiment of the invention, the securing system for a mobile device comprises: a retaining member having a generally U-shaped arrangement and including a connecting end at a first distal end portion and a securing end at an opposing second distal end portion; a first connector carried by said connecting end that engages a first port on the mobile device so that when said first connector engages the first port, said retaining member extends outwardly from the mobile device and said securing end is directed back towards the mobile device so that said securing end is adjacent to the mobile device; a finger gap defined by said retaining member and the mobile device and adapted to receive a finger; an impact bumper adapted to receive the circumference of the mobile device comprising: a first bottom bumper portion that extends outwardly from said connecting end and generally parallel to a bottom side of the mobile phone; an opposing second bottom bumper portion that extends outwardly from said securing end and in an opposite direction from said first bottom bumper portion; a first side bumper portion carried at a first distal end by said first bottom bumper portion so that said first side bumper portion extends generally perpendicular to said first bottom bumper portion and generally parallel to a first side of the mobile device; a second side bumper portion carried at a first distal end by said second bottom bumper portion so that said second side bumper portion extends generally perpendicular to said second bottom bumper portion and generally parallel to a second side of the mobile device; a top bumper portion that extends generally parallel to a top side of the mobile device and interconnects a second distal end of said first side bumper portion with a second distal end of said second bumper portion; wherein, when said first connector engages the port on the mobile device, said finger gap allows a user to insert a finger into said finger gap to reduce the risk of the mobile device falling from the user's grasp and said first lower bumper portion and said second lower bumper portion receive at least a portion of the bottom side of the mobile device, said first side bumper portion and said second side bumper portion receive at least a portion of the first side and second side of the mobile device and said top bumper portion receives at least a portion of the top side of the mobile device, thereby covering at least a portion of the circumference of the mobile device.

In one embodiment, at least one of said first side bumper portion and said second side bumper portion comprises an upper side bumper and a lower side bumper wherein said upper side bumper and said lower side bumper may be releaseably secured to one another to allow said impact bumper to more easily receive the circumference of the mobile device.

In one embodiment, at least one of said first side bumper portion and said second side bumper portion is stretchable to allow said impact bumper to more easily receive the circumference of the mobile device.

In one embodiment, the securing system for a mobile device comprises: an impact bumper adapted to receive and cover at least a portion of the circumference of the mobile device having a top bumper portion that contacts at least a portion of the top side of the mobile device, a bottom bumper portion that contacts at least a portion of the bottom side of the mobile device and two opposing side bumper portions that contact at least a portion of the two opposing sides of the mobile device; a retaining member having a connecting end and a securing end wherein said connecting end and said securing end of said retaining member are carried by one of said top bumper portion, bottom bumper portion and two opposing side bumper portions so that said retaining member extends outwardly from the mobile device; a first connector carried by said connecting end of said retaining member that engages a first port on the mobile device so that when said first connector engages the first port, said securing end is directed back towards the mobile device so that said securing end is held adjacent to the mobile device by said impact bumper; a finger gap defined by said retaining member and the mobile device for receiving a finger; and, wherein, when said first connector engages the port on the mobile device, said finger gap allows a user to insert a finger into said finger gap to reduce the risk of the mobile device falling from the user's grasp and said bottom bumper portion, said top bumper portion and said two opposing side bumper portions cover at least a portion of the circumference of the mobile device.

Another embodiment of the invention further comprises a second connector carried by said securing end of said retaining member that engages a second port on the mobile device so that when said second connector engages the second port, said securing end is held adjacent to the mobile device by said second connector.

In at least one embodiment, the bottom bumper portion interconnects said connecting end and said securing end of said retaining member so that said finger gap is defined by said retaining member and said bottom bumper portion.

In one embodiment, at least one of said two opposing side bumper portions comprises an upper side bumper and a lower side bumper wherein said upper side bumper and said lower side bumper may be releaseably secured to one another to allow said impact bumper to more easily receive the circumference of the mobile device.

In one embodiment, at least one of said two opposing side bumper portions is stretchable to allow said impact bumper to more easily receive the circumference of the mobile device.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 2 shows a perspective view of a first embodiment of the invention;

FIGS. 3A-3B show a perspective view of a first embodiment of the invention being connected to the mobile device;

FIG. 5E shows a perspective view of another embodiment of the invention;

FIG. 7A shows a perspective view of another embodiment of the invention; and FIG. 7B shows a perspective view of another embodiment of the invention.

Figure 1:
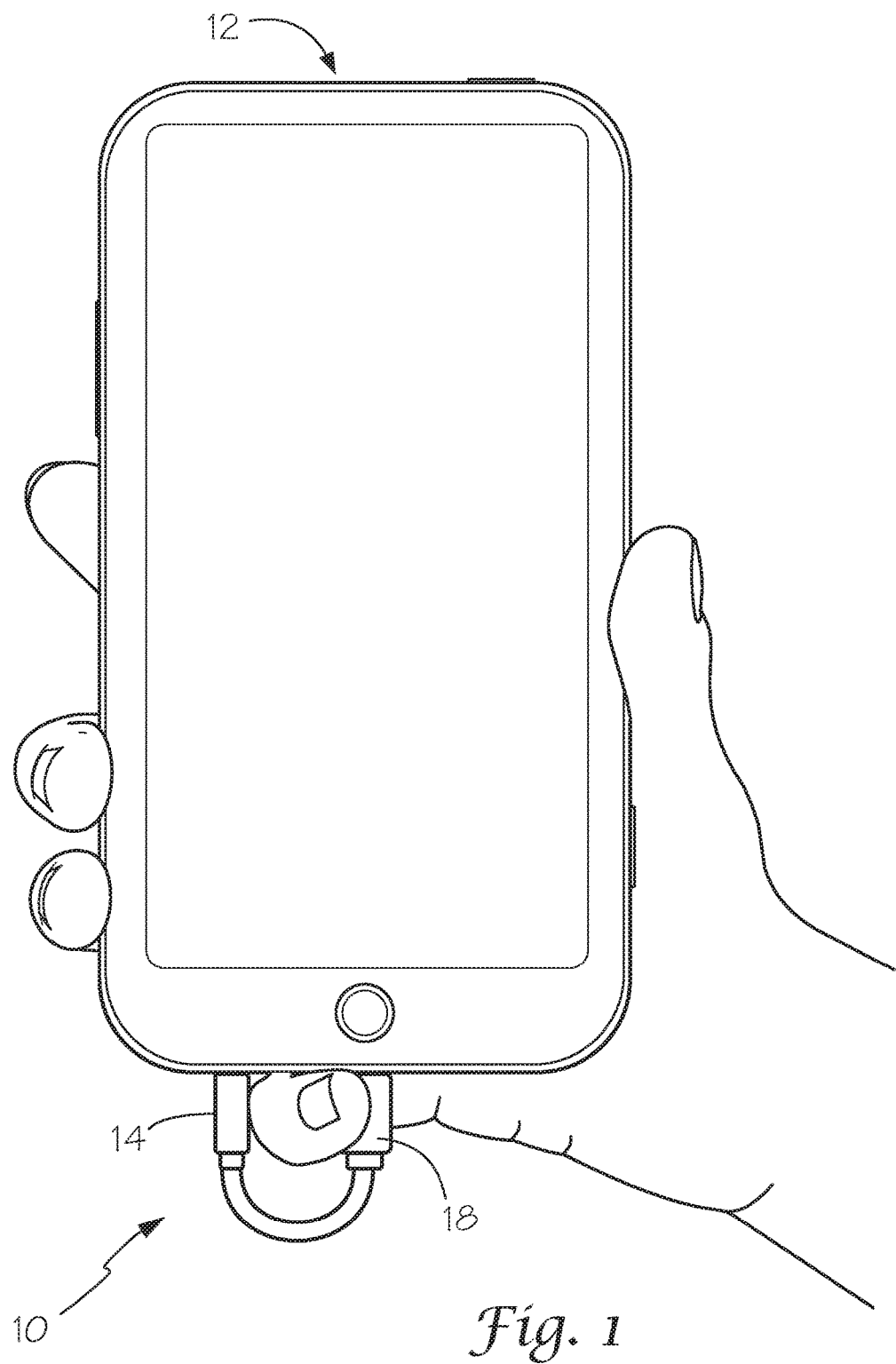
FIG. 1 shows a top plan view of the invention being used on a mobile device.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention comprises a mobile device securing system that allows a user to insert his/her finger into a loop created by the invention when engaged with the mobile device. This invention may be used on any number of mobile devices, provided that the mobile device has one or more ports included therein. Referring to FIGS. 1-3 (A-B), a first embodiment the invention is generally shown as 10. The invention has a connecting end 17 that includes a connector 18 that is adapted to be received by and engage a first port 20 in the mobile device 12 and a securing end 13 that includes a second connector 14 that is adapted to be received by a second port 16 in the mobile device, thereby connecting the invention 10 to the mobile device. The connecting end 17 is interconnected to the securing connecting end 13 by a retaining member 22. This retaining member 22 could be flexible, malleable, rigid or stretchy. When the first connector 18 and second connector 14 are fully inserted into the respective ports 16 and 20 on the mobile device as is shown in FIG. 3B, the invention creates a finger gap 24 at the bottom of the mobile device that is disposed between the connecting end and the securing end 13 and 17. This finger gap 24 is defined by the retaining member 22 and the mobile device 12 and allows the user to insert his/her finger (often times the pinky finger) into the finger gap created by the retaining member 22 while using the mobile device 12.

When the retaining member 22 is either malleable or rigid, it will have a predefined shape such that the retaining member is radiused or may have one or more angles to define any number of shapes generally known so long as the shape and size of the finger gap 24 created by the retaining member 22 will allow the user to insert his/her finger therein, when the two connectors 14 and 18 are connected to the phone by the two respective ports 16 and 20. The retaining member may be made of any suitable material including natural materials, synthetic materials such as polymers and/or a combination of natural and synthetic materials that will allow the finger gap to be defined when the first and second connectors 14 and 18 are inserted in the respective ports 16 and 20 in the mobile device.

In the embodiment shown in FIGS. 1-3 (A-B), the second connector 14 comprises a headphone jack that is adapted to be securely but removably received by the headphone port 16 in the mobile device. In this embodiment, the first 18 comprises a power jack adapted to be securely but removably received by the power port 20 in the mobile device. In one embodiment, the first and second connectors 14 and 18 are jacks that are made of plastic or other suitable material that does not electronically engage the respective ports 16 and 20 in the mobile device. In other embodiments, the first and second connectors may comprise functional jacks that electronically engage the respective ports.

In at least one embodiment, the first connector 18 can comprise a power/data jack that is adapted to be securely but removably received by the power/data port 20 in the mobile device. In this embodiment, the power/data jack may be made of plastic or other suitable material that will not electronically engage the data/power port 20 of the mobile device. In other embodiments, however, the data/power jack 18 can be a functional data/power jack that electronically engages the data/power port 20 in the mobile device 12. When made of plastic, the first connector may include at least one raised area 26 to help secure the first connector remain in the second port 20 when the two are engaged. This raised area 26 may be included on the first connector so long as it comprises a jack with at least one substantially flat surface (preferably one of the top and bottom surfaces). Similarly, when the second connector 14 is made of plastic or other materials, it may include ridges 28 that are angled towards the second connecting end 13 so as to provide additional friction when attempting to remove second connector from the port 16.

Figure 3C:
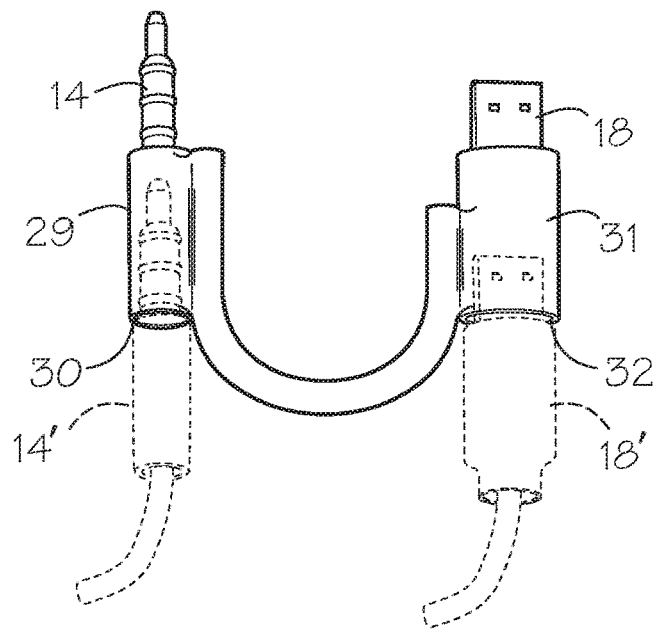
FIG. 3C shows a perspective view of another embodiment of the invention.

Referring now to FIG. 3C, another embodiment of the invention can be seen. In this embodiment, both connecting end 31 and the securing end 29 include pass through ports 30 and 32 that allow the ports 16 and 20 in the mobile device to be used for their intended purposes while simultaneously engaged by the connecting ends 14 and 18 of the present invention. These pass through ports 30 and 32 allow jacks 14' and 18' to be in electrical communication with the first and second connectors 14 and 18, thus electronically engage the respective ports through the first and/or second connectors 14 and 18. In this embodiment, the first and second connectors 14 and 18 must comprise jacks that are able to electronically engage the ports in the mobile phone to allow the pass through ports 30 and 32 to transmit electronic signals between the jacks 14' and 18' and their respective ports (shown as 16 and 20 in FIG. 3A).

In the embodiment shown in FIG. 3C, the second connector 14 comprises a standard headphone jack, that is electronically connected to the pass through port 30, which is adapted to receive a headphone jack 14'. This allows the user to create a finger gap with the invention while still being able to use the headphones and/or the headphone port (shown as 16 in FIG. 3A). In this embodiment, the first connector 18 comprises a power/data jack that is electronically connected to the pass through port 32 that is adapted to receive a power/data jack 18'. Again, these pass through ports 30 and 32 allow the ports on the mobile device to be used for their intended purposes while engaged by the first and/or second connectors 14 and 18 to create a finger gap so that the mobile device may be connected to a power and/or data source and to transmit electrical signals to the headphone jack 14' and the power data jack 18'. As can be seen, the jacks that are normally used in association with the ports in the mobile device may be plugged into the respective receiving ends 30 and 32, thereby electrically connecting to the jacks 14' and 18' to their respective ports (shown as 16 and 20 in FIG. 3A).

Figure 4A:
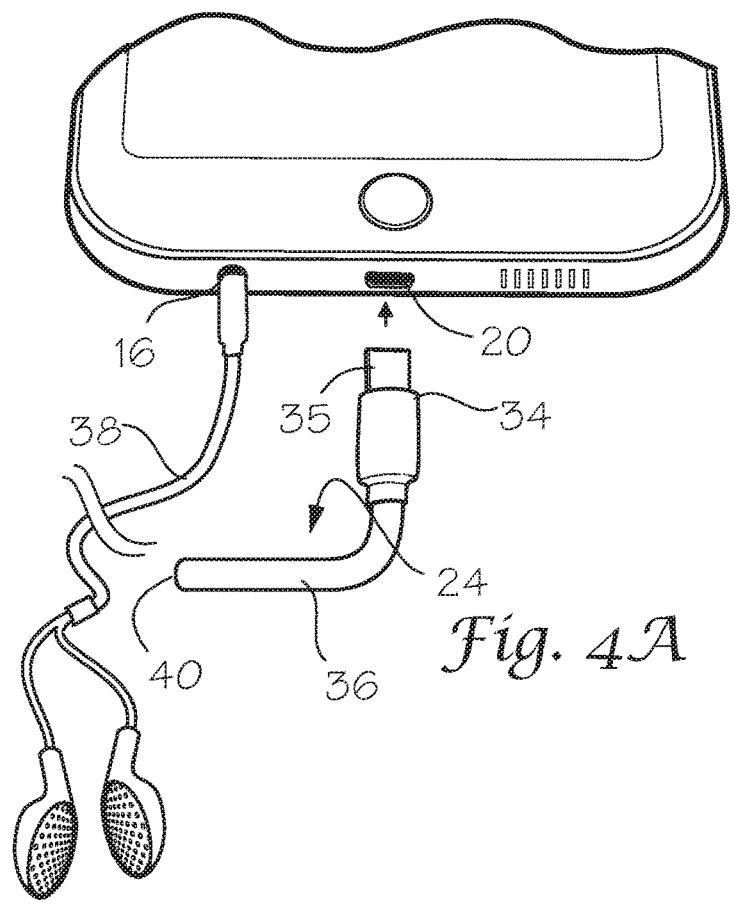
FIG. 4A shows a perspective view of a second embodiment of the invention being connected to the mobile device.

Yet another embodiment may be seen in FIG. 4A. In this embodiment, the invention utilizes a connecting end 34 having a single connector 35 that is adapted to engage and be securely but removably received by a port 20 in the mobile device. The connecting end 34 is attached to a substantially "L" shaped retaining member 36. The finger gap 24 is created when the connector 35 is inserted into the port 20 and headphones 38 are plugged into the headphone port 16 of the mobile device. When both the connector 35 and the headphones 38 are inserted into their respective ports 16 and 20, a substantially square or rectangular finger gap 24 is defined when the securing end 40 of the retaining member 36 either contacts or overlaps the cord of the headphones 38. While in the shown embodiment the retaining member 36 includes a substantially right angle to create a substantially "L" shape, the retaining member may use other angles so long as a finger gap that sufficiently secures the user's finger is defined. Depending on the angle included in the retaining member, the length of the retaining member 36 may need to change to ensure contact between the securing end 40 of the retaining member 36 and the cord for the headphones 38.

Figures 4B, 5A, 5B:
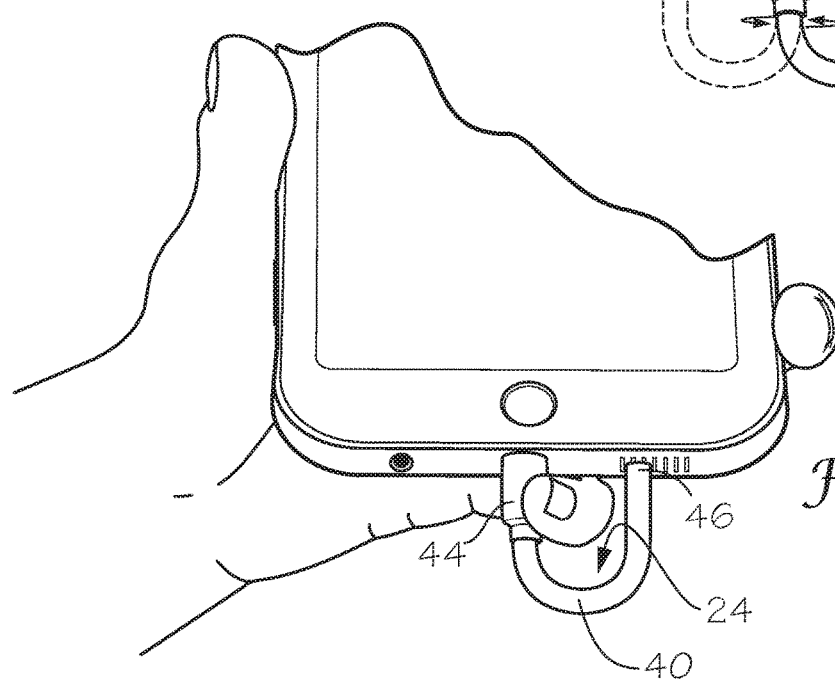
FIG. 4B shows a perspective view of an embodiment of the invention where the retaining member forms an opening at one end.
FIGS. 5A-5B show a perspective view of a third embodiment of the invention being connected to the mobile device; and, FIGS. 5C-5D show a perspective view of another embodiment of the invention.

The embodiment shown in FIG. 4B is similar to the embodiment shown in FIG. 4A with the exception that the securing end 40 of the retaining member 36 defines an opening 42 through which the jack and cord of the headphones 38 may be inserted. The opening 42 secures the cord of headphones to the retaining member 36 to create a more secure finger gap 24 that is defined when the connecting end 34 and the headphones 38 are inserted into their respective ports.

The embodiment shown in FIGS. 5A-B are primarily designed for users who hold the mobile device in their left hand. Since mobile devices tend not to include any ports on the right side of the power/data port (when viewed from above the face of the device), the invention provides for a retaining member 40 that defines a finger gap 24 that is located to the right of the power/data port 20 in the mobile device. Similar to the embodiment shown in FIG. 4A, this embodiment includes a connecting end 44 having a connector 45 that is adapted to engage and be securely but removably received by the port 20. In the shown embodiment, the retaining member 40 is radiused so that it creates a substantially "U" shape. However, the retaining member could include one or more angles to provide the retaining member with any number of shapes, so long as the shape would allow for the user to insert his/her finger in the finger gap 24 defined by the retaining member when the connector 45 is inserted in the port 20. Because the securing end 46 of the retaining member 40 is not secured to the phone by one of the ports, it is preferably made of malleable or rigid material to provide for greater stability. Because the securing end 46 is not secured to the phone, the retaining member may be rotatably attached to the connecting end 44 so that the retaining member may define a finger gap 24 to the right or left side of the port. To ensure that the retaining member does not rotate when such rotation is not desired, the retaining member 40 should be attached to the connecting end 44 so that a predefined force must be exerted on the retaining member to cause it to rotate.

As shown in FIG. 5A, the securing end 46 of the retaining member 40 may include a clip 47 that is adapted to engage both the front and back of the mobile device when the connecting end 44 is connected to the port via the connector 45 so that the front clip arm 47a lays substantially flat against the front face of the mobile device 12 and the rear clip arm 47b lays substantially flat against the rear face of the mobile device. This clip 47 will provide more stability to the retaining member 40 and ensure that it does not unnecessarily rotate during use. This clip may be used on any embodiments of the invention described herein where securing end of the retaining member is not secured to the mobile device by insertion into a port.

FIGS. 5C-D show an embodiment where the connecting end 48 includes a support plate 56 attached to or defined by the rear surface 57 of the connecting end 48 so that when the connecting end connected to the port via the connector 45, the support plate 56 lays substantially flat against the rear surface of the mobile device, thereby providing additional support to the connecting end and preventing unwanted disconnection of the connecting end from the port. While the shown embodiment disposes the support plate 56 on the rear surface 57 of the connecting end 48, the support plate 56 may be disposed on the front surface 59 of the connecting end 48 so that it lays substantially flat against the face of the mobile device when the connector 45 is inserted into the port. Alternatively, the invention could include two support plates disposed on both the front surface 57 and rear surface 59 of the connecting end so that when the connecting end engages the port via the connector, the support plates engage both the rear surface and the face of the mobile device. This support plate, including any of the alternate configurations described above, may be used on any of the embodiments of the invention described herein, including the embodiment shown in FIG. 6B.

FIG. 5E shows another embodiment that is similar to the one shown in FIG. 5A, except this embodiment further includes a crossbar 58 that interconnects the securing end 60 and the connecting end 48 of the retaining member 52. The crossbar 58 provides additional stability for the retaining member 52 and lays substantially flat against the bottom surface of the mobile device when the connector 45 is inserted into one of the mobile device's ports.

Figure 6A:
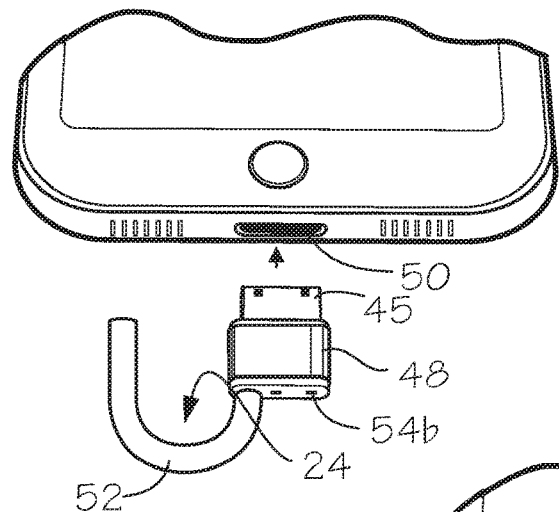
FIG. 6A shows a perspective view of another embodiment of the invention.
Figure 6B:
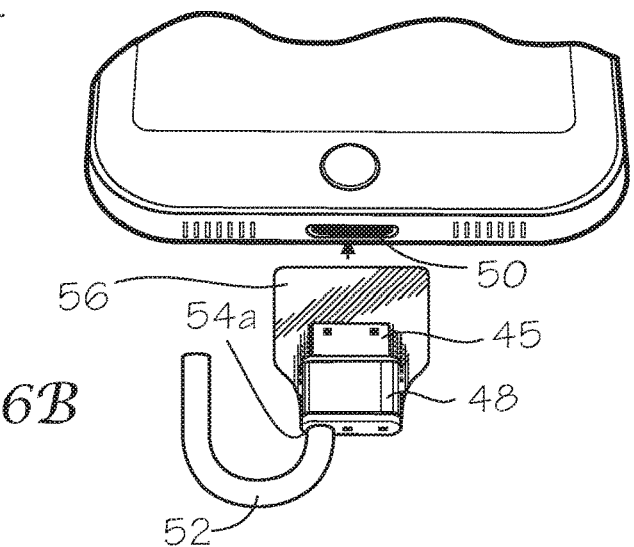
FIG. 6B shows a perspective view of another embodiment of the invention.

FIGS. 6A-B show another embodiment of the invention that is adapted for use on a jack that is wider than the jacks shown in the previous figures. As evidenced by this embodiment, the invention (including each embodiment described herein) can utilize any type of connector that is generally know so long as it is compatible with the port provided in the mobile device. Preferably, the connector used would be adapted to electronically communicate with the port but any connector that is adapted to be inserted into the port can be used. While the shown embodiments show connectors that are compatible with the iPhone® connectors that are compatible with other brands of mobile devices are contemplated as falling within the scope of the invention. In this embodiment, a connecting end 48 includes a connector 45 that comprises a wide jack (such as the ones found on versions 1-4 of the iPhone®) that is adapted to engaged and be securely but removably connected to the port 50. As is true with all of the embodiments described herein the first connector could comprise any type of jack that is compatible with any of the ports provided on the mobile device. A retaining member 52 is removably connected to the connecting end 48 by openings 54*a* and 54*b* that are adapted to securely but removably receive the retaining member. The user may insert the retaining member into either opening so that when the connecting end is inserted into the port, the retaining member 52 can create a finger gap 24 on either side of the port. This allows the user to insert his/her finger into the finger gap regardless of which hand is used to carry the mobile device.

Figure 6C:
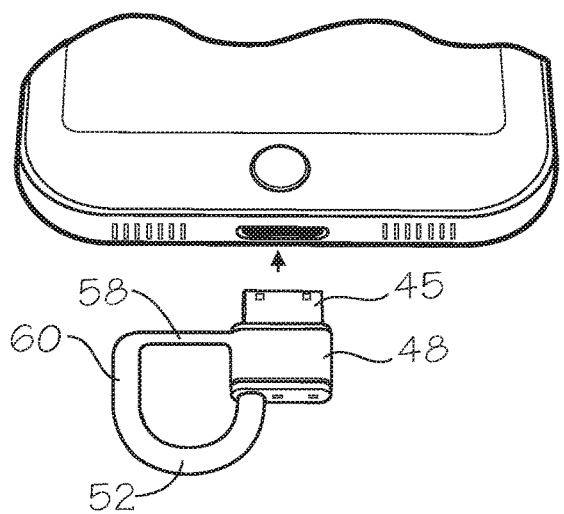
FIG. 6C shows a perspective view of another embodiment of the invention.

FIG. 6C shows an embodiment that is similar to the one shown in FIG. 5E in that it includes a crossbar 58 that interconnects the securing end 60 and the connecting end 48 of the retaining member 52. The retaining cross bar 58 provides additional stability for the retaining member 52 and lays substantially flat against the bottom surface of the mobile device when the connector 45 is inserted into one of the mobile device's ports.

FIGS. 7A-B show the final embodiments of the invention. These embodiments show an impact bumper generally shown as 70 that incorporates the retaining member 74. When in use, the impact bumper receives at least a portion of the circumference of the mobile device 12 so that the mobile device can be protected from impacts caused by dropping the mobile device. In some instances, the impact bumper receives and secures a vast majority or the entirety of the circumference of the mobile device. The embodiment shown in FIG. 7A includes a retaining member 72 that includes a connecting end 74 and a securing end 76. A first connector 78 is disposed on the connecting end 74 and is adapted to engage a power/data port of the mobile device. This embodiment also includes a second connector 80 disposed on the securing end 76 that is adapted to engage the headphones port of the mobile device. The connecting end and the securing end are interconnected by the retaining member 72.

Extending generally perpendicularly from the connecting end 74 is a first bottom bumper portion 82 of the impact bumper that is adapted to receive and conform to at least a portion of the bottom of the mobile device when the impact bumper 70 is secured to the mobile device. The impact bumper further includes a first lower side bumper portion 84 that is connected to the first bottom bumper portion 82 so that when the impact bumper is secured to the mobile device the first lower side bumper portion 84 receives and conforms to at least a portion of the first side of the mobile device.

Extending generally perpendicularly from the securing end 72 is a second bottom bumper portion 86 that is adapted to receive and conform at least a portion of the bottom of the mobile device when the impact bumper 70 is secured to the mobile device. The impact bumper further includes a second lower side bumper portion 88 that is connected to the second bottom bumper portion 86 so that when the impact bumper 70 is secured to the mobile device the second lower side bumper portion 88 receives and conforms to at least a portion of the second side of the mobile device.

The embodiment shown in FIG. 7A further includes an top bumper portion 90 that is adapted to receive the top of the mobile device and interconnects a first upper side bumper portion 92 and the second upper side bumper portion 94. When the impact bumper 70 is in use, the first and second upper side bumper portions 92 and 94 receive and secure at least a portion of the two opposing sides of the mobile device, while the top bumper portion 90 receives and secures at least a portion of the top side of the mobile device.

The embodiment shown in FIG. 7B is substantially identical to the one shown in FIG. 7A. In this embodiment, however, the securing end 74 does not include a second connector 80. As also can be seen in this embodiment, a single bottom bumper portion 83 is used so that it receives the entire bottom side of the mobile device and interconnects the securing end 76 to the connecting end 74 of the retaining member 72.

In the embodiments shown in FIG. 7A-B, the first and second upper side bumper portions 92 and 94 may be releaseably secured to the first and second lower side bumper portions 84 and 88. When connected, the first upper side bumper portion 92 and the first lower side bumper portion 84 create a unitary first side bumper portion that receives and secures at least a portion of the first side of the mobile device and preferably receives and secures a vast majority, if not all, of the first side of the mobile device. Similarly, the second upper side bumper portion 94 and the second lower side bumper portion 88 can be connected to create a unitary second side bumper portion that receives and secures at least a portion of the second side of the mobile device and preferably receives and secures a vast majority, if not all, of the second side of the mobile device. In the shown embodiment, first and second upper side bumper portions 92 and 94 include a male snap and/or connector 96 and 98 while the first and second lower side bumper portions 84 and 88 include a female snap receptor 100 and 102 adapted to releaseably receive the snap connectors. Any generally known means of connecting two sides such as snaps, ties, screws, hooks and loops, zippers or the like may be used.

While not shown, the first upper side bumper portion 92 and first lower side bumper portion 84 could be replaced by a unitary first side bumper portion. Similarly, the second upper side bumper portion 92 and second lower side bumper portion 84 could be replaced by a unitary second side bumper portion. In this embodiment, the first and second unitary side bumper portions could be elastic so that they could be stretched to allow the impact bumper 70 to more easily receive the circumference of the mobile device or a portion thereof.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A securing system for a mobile device comprising:
   a retaining member having a generally U-shaped arrangement and including a connecting end at a first distal end portion and a securing end at an opposing second distal end portion;
   a first connector carried by said connecting end that engages a first port on the mobile device so that when said first connector engages the first port, said retaining member extends outwardly from the mobile device and said securing end is directed back towards the mobile device so that said securing end is adjacent to the mobile device;
   a finger gap defined by said retaining member and the mobile device and adapted to receive a finger;
   an impact bumper adapted to receive the circumference of the mobile device comprising:
      a first bottom bumper portion that extends outwardly from said connecting end and generally parallel to a bottom side of the mobile phone;
      an opposing second bottom bumper portion that extends outwardly from said securing end and in an opposite direction from said first bottom bumper portion;
      a first side bumper portion carried at a first distal end by said first bottom bumper portion so that said first side bumper portion extends generally perpendicular to said first bottom bumper portion and generally parallel to a first side of the mobile device;
      a second side bumper portion carried at a first distal end by said second bottom bumper portion so that said second side bumper portion extends generally perpendicular to said second bottom bumper portion and generally parallel to a second side of the mobile device;
      a top bumper portion that extends generally parallel to a top side of the mobile device and interconnects a second distal end of said first side bumper portion with a second distal end of said second bumper portion;
   wherein, when said first connector engages the port on the mobile device, said finger gap allows a user to insert a finger into said finger gap to reduce the risk of the mobile device falling from the user's grasp and said first lower bumper portion and said second lower bumper portion receive at least a portion of the bottom side of the mobile device, said first side bumper portion and said second side bumper portion receive at least a portion of the first side and second side of the mobile device and said top bumper portion receives at least a portion of the top side of the mobile device, thereby covering at least a portion of the circumference of the mobile device.

2. A securing system of claim 1 wherein at least one of said first side bumper portion and said second side bumper portion comprises an upper side bumper and a lower side bumper wherein said upper side bumper and said lower side bumper may be releaseably secured to one another to allow said impact bumper to more easily receive the circumference of the mobile device.

3. A securing system of claim 1 wherein at least one of said first side bumper portion and said second side bumper portion is stretchable to allow said impact bumper to more easily receive the circumference of the mobile device.

4. The securing system of claim 1 further comprising a second connector carried by said securing end of said retaining member that engages a second port on the mobile device so that when said second connector engages the second port, said securing end is held adjacent to the mobile device by said second connector.

5. The securing system of claim 1 wherein said finger gap is defined by said retaining member and the mobile device.

6. The securing system of claim 1 further comprising a third bottom bumper portion that interconnects said connecting end and said securing end of said retaining member so that said finger gap is defined by said retaining member and said third bottom bumper portion.

7. A securing system for a mobile device comprising:
   an impact bumper adapted to receive and cover at least a portion of the circumference of the mobile device having a top bumper portion that contacts at least a portion of the top side of the mobile device, a bottom bumper portion that contacts at least a portion of the bottom side of the mobile device and two opposing side bumper portions that contact at least a portion of the two opposing sides of the mobile device;
   a retaining member having a connecting end and a securing end, wherein said connecting end and said securing end of said retaining member are carried by one of said top, bottom or side bumper portions so that said retaining member extends outwardly from the mobile device;
   a first connector carried by said connecting end of said retaining member that engages a first port on the mobile device so that when said first connector engages the first port, said securing end is directed back towards the mobile device so that said securing end is held adjacent to the mobile device by said impact bumper;
   a finger gap defined by said retaining member and adapted to receive a finger; and,
   wherein, when said first connector engages the port on the mobile device, said finger gap allows a user to insert a finger into said finger gap to reduce the risk of the mobile device falling from the user's grasp and said bottom bumper portion, said top bumper portion and said two opposing side bumper portions cover at least a portion of the circumference of the mobile device.

8. The securing system of claim 7 further comprising a second connector carried by said securing end of said retaining member that engages a second port on the mobile device so that when said second connector engages the second port, said securing end is held adjacent to the mobile device by said second connector.

9. The securing system of claim 7 wherein said bottom bumper portion interconnects said connecting end and said securing end of said retaining member so that said finger gap is defined by said retaining member and said bottom bumper portion.

10. The securing system of claim 7 wherein at least one of said two opposing side bumper portions comprises an upper side bumper and a lower side bumper wherein said upper side bumper and said lower side bumper may be releaseably secured to one another to allow said impact bumper to more easily receive the circumference of the mobile device.

11. The securing system of claim 7 wherein at least one of said two opposing side bumper portions is stretchable to allow said impact bumper to more easily receive the circumference of the mobile device.

12. The securing system of claim 7 wherein said finger gap is defined by said retaining member and the mobile device.

\* \* \* \* \*